United States Patent
Fuchigami

(10) Patent No.: US 10,018,263 B2
(45) Date of Patent: Jul. 10, 2018

(54) DRIVE TRANSMISSION MECHANISM

(71) Applicant: FUJI XEROX CO., LTD., Tokyo (JP)

(72) Inventor: Makoto Fuchigami, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 365 days.

(21) Appl. No.: 14/804,893

(22) Filed: Jul. 21, 2015

(65) Prior Publication Data

US 2016/0258524 A1    Sep. 8, 2016

(30) Foreign Application Priority Data

Mar. 4, 2015  (JP) ................................. 2015-042130

(51) Int. Cl.
*F16H 55/17*  (2006.01)

(52) U.S. Cl.
CPC .................................... *F16H 55/17* (2013.01)

(58) Field of Classification Search
CPC ........................... F16H 55/17; F16H 2055/176
See application file for complete search history.

(56) References Cited

U.S. PATENT DOCUMENTS

| | | | | |
|---|---|---|---|---|
| 2,885,903 A * | 5/1959 | Parz | ........................ | F16H 55/22 74/458 |
| 3,150,531 A * | 9/1964 | Singer | ................... | B60B 35/001 180/371 |
| 3,262,331 A * | 7/1966 | Breuer | ...................... | F16H 1/04 74/412 R |
| 5,341,699 A * | 8/1994 | Rouverol | ............... | F16H 55/08 74/462 |
| 5,485,761 A * | 1/1996 | Rouverol | ............... | F16H 55/08 29/893.3 |
| 2007/0186711 A1 * | 8/2007 | Oberle | .................. | F16F 15/265 74/460 |
| 2009/0165585 A1 * | 7/2009 | Zhuravlev | ............... | F16H 55/08 74/462 |

FOREIGN PATENT DOCUMENTS

| | | |
|---|---|---|
| CN | 101718514 A | 6/2010 |
| CN | 203979329 U | 12/2014 |
| JP | 2000-258301 A | 9/2000 |

OTHER PUBLICATIONS

Communication dated Feb. 1, 2018 from the State Intellectual Property Office of the P.R.C. in counterpart Chinese application No. 201510566532.6.

* cited by examiner

*Primary Examiner* — David M Fenstermacher
(74) *Attorney, Agent, or Firm* — Sughrue Mion, PLLC

(57) ABSTRACT

A drive transmission mechanism includes plural gears having meshing teeth and a recessed or projecting portion provided on a side surface of at least one of the gears. The side surface crosses a rotation axis of the at least one of the gears. The recessed or projecting portion is at least one of a cavity and a protrusion having a ridge that extends so as to follow an outline of at least one of the teeth and that serves as a marking for measuring wear of the at least one of the teeth.

7 Claims, 4 Drawing Sheets

DRIVE TRANSMISSION MECHANISM

CROSS-REFERENCE TO RELATED APPLICATIONS

This application is based on and claims priority under 35 USC 119 from Japanese Patent Application No. 2015-042130 filed Mar. 4, 2015.

BACKGROUND (i) Technical Field

The present invention relates to a drive transmission mechanism.

(ii) Related Art

A drive transmission mechanism that transmits a drive force through gears is known.

In such a drive transmission mechanism, the teeth of the gears wear when the gears are used. Accordingly, there has been a demand for a technology for measuring the wear.

SUMMARY

According to an aspect of the invention, there is provided a drive transmission mechanism including plural gears having meshing teeth and a recessed or projecting portion provided on a side surface of at least one of the gears. The side surface crosses a rotation axis of the at least one of the gears. The recessed or projecting portion is at least one of a cavity and a protrusion having a ridge that extends so as to follow an outline of at least one of the teeth and that serves as a marking for measuring wear of the at least one of the teeth.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described with reference to the drawings.

Figure 1:
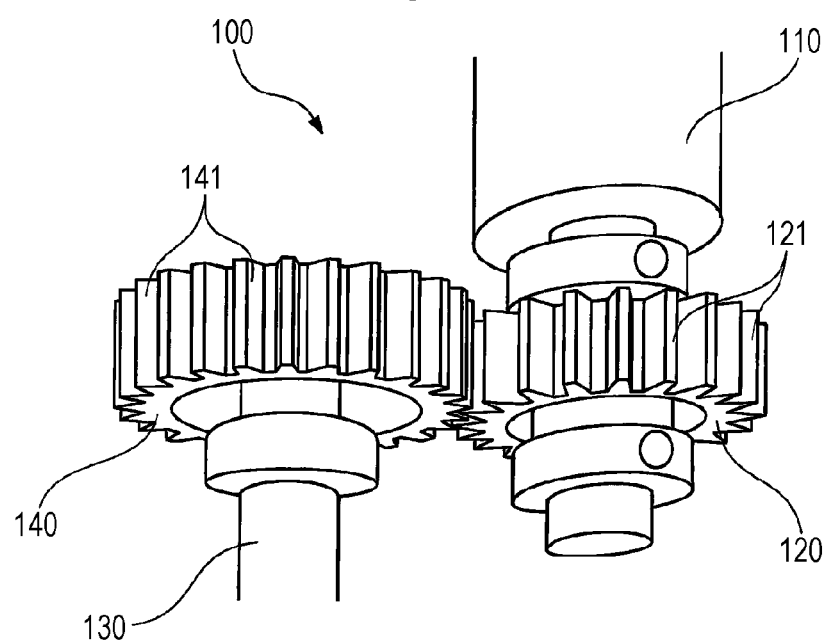
FIG. 1 is a perspective view of a gear mechanism that corresponds to a drive transmission mechanism according to a first exemplary embodiment.

FIG. 1 is a perspective view of a gear mechanism that corresponds to a drive transmission mechanism according to a first exemplary embodiment.

A gear mechanism 100 according to the present exemplary embodiment includes a first gear 120 fixed to a first drive shaft 110 and a second gear 140 fixed to a second drive shaft 130. The first gear 120 and the second gear 140 have meshing teeth 121 and 141, respectively. The first gear 120 and the second gear 140 are examples of gears according to an exemplary embodiment of the present invention. In this example, spur gears are used. In the present exemplary embodiment, each of the two gears 120 and 140 has markings on a side surface thereof. However, in the following description, only the markings provided on the second gear 140 will be explained.

Figure 2:
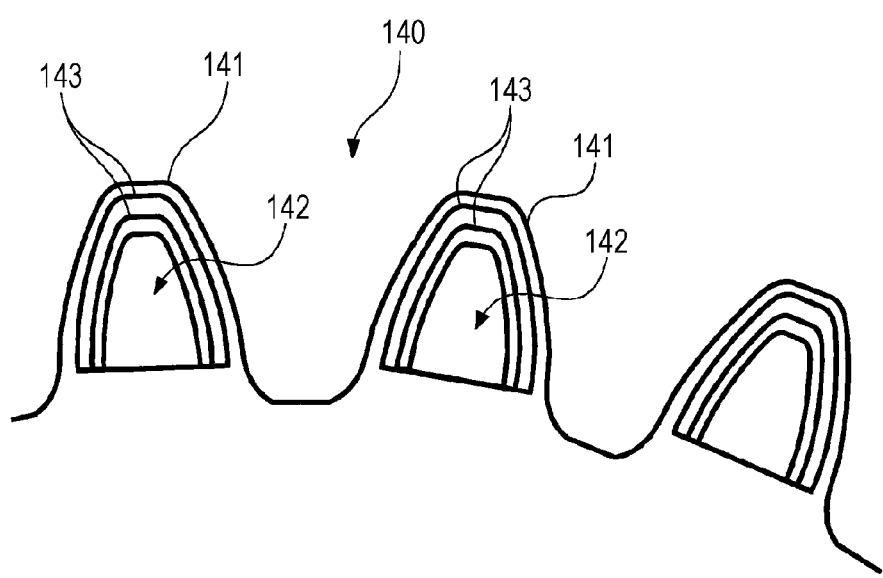
FIG. 2 is an enlarged view of a side surface of a gear.

FIG. 2 is an enlarged view of a side surface of the second gear 140.

Each tooth 141 of the second gear 140 has a recessed portion 142 on a side surface thereof. The recessed portion 142 has ridges 143 that serve as markings. The recessed portion 142 is a cavity that is recessed inward from the side surface of the tooth 141. In this example, the ridges 143 of the recessed portion 142 have a shape obtained by reducing the outline of the tooth 141. It is not necessary that the ridges 143 have a shape obtained by reducing the outline of the tooth 141 as long as the ridges 143 extend so as to follow the outline of the tooth 141. For example, the ridges 143 may extend along lines that are separated from the outline by a constant distance. In the example illustrated in FIG. 2, the reduction ratio in the vertical direction differs from that in the horizontal direction. However, the ridges 143 may have shapes with the same aspect ratio.

FIG. 2 illustrates coarse markings to increase the viewability of the ridges 143 that serve as the markings. However, in practice, the recessed portion 142 formed in the gear has finer ridges 143 so that the amount of wear may be more accurately measured.

Figure 3:
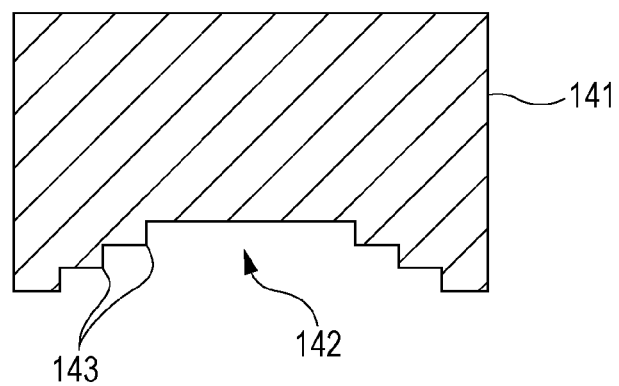
FIG. 3 is a sectional view illustrating the shape of a recessed portion.

FIG. 3 is a conceptual sectional view illustrating the shape of the recessed portion.

In the present exemplary embodiment, the recessed portion 142 is formed in the side surface of the tooth 141 in a stepwise fashion, and the edges of the steps serve as the ridges 143.

Even when the recessed portion 142 is not formed in a stepwise fashion, since the ridges 143 of the recessed portion 142 serve as the markings, clear markings may be formed even when small gears are formed by using a resin. When, for example, the markings are formed of grooves, there is a risk that the resin cannot reach narrow regions of a mold and the markings cannot be readily formed. In contrast, when the recessed portion 142 according to the present exemplary embodiment is formed, the resin reliably flows to portions of a mold that correspond to the ridges 143, and clear ridges 143 may be formed.

In addition, when the recessed portion 142 is formed in a stepwise fashion, not only the ridges 143 but also the side surfaces (risers) of the steps also serve as the markings. Therefore, the markings may be made clearer.

Since the ridges 143 shown in FIGS. 2 and 3 are used as the markings, wear of the tooth 141 may be accurately measured.

Figure 4:
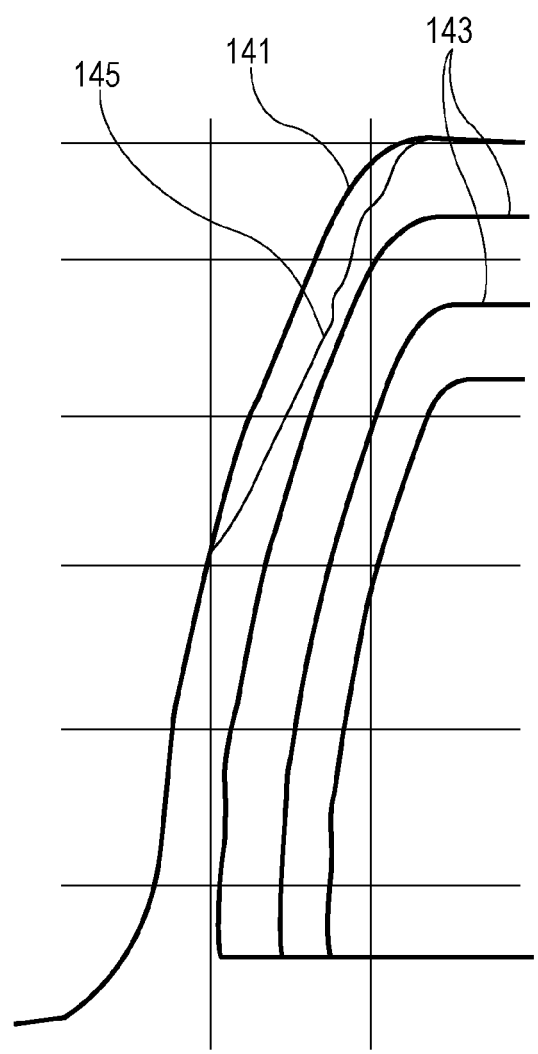
FIG. 4 illustrates an example of wear measurement.

FIG. 4 illustrates an example of wear measurement.

FIG. 4 illustrates a shape 145 into which the tooth 141 may wear together with the outline of the tooth 141 and the ridges 143 that serve as the markings. When the tooth 141 wears in this manner, the wear may be directly measured by comparing the shape 145 with the shapes of the ridges 143. Thus, the measurement accuracy is increased.

Next, a second exemplary embodiment of the present invention will be described.

The second exemplary embodiment is similar to the first exemplary embodiment except that a projecting portion is provided on a surface of each tooth instead of the above-described recessed portion 142. Therefore, only the difference from the first exemplary embodiment will be described, and redundant description will be omitted.

Figure 5:
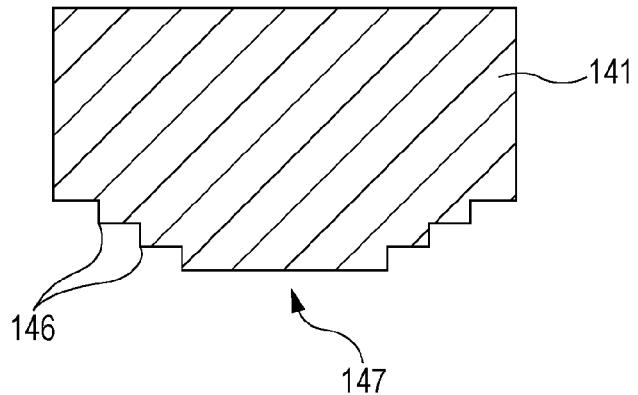
FIG. 5 is a sectional view illustrating the shape of a projecting portion according to a second exemplary embodiment.

FIG. 5 is a sectional view illustrating the shape of the projecting portion according to the second exemplary embodiment.

In the second exemplary embodiment, a projecting portion 147 having ridges 146 that serve as markings is formed on a side surface of each tooth 141. The projecting portion 147 is a protrusion that projects outward from the side surface of the tooth 141. The projecting portion 147 projects from the side surface in a stepwise fashion, and the edges of the steps serve as the ridges 146. Also when the ridges 146 of the projecting portion 147 are used as the markings, similar to the first exemplary embodiment, clear markings may be formed by resin molding or the like. Since the projecting portion 147 is formed in a stepwise fashion, the side surfaces (risers) of the steps also serve as the markings. Therefore, the markings may be made clearer.

Next, a third exemplary embodiment of the present invention will be described.

The third exemplary embodiment is similar to the second exemplary embodiment except that a tapered projecting portion is provided instead of the above-described stepwise projecting portion 147. Therefore, only the difference from the second exemplary embodiment will be described, and redundant description will be omitted.

Figure 6:
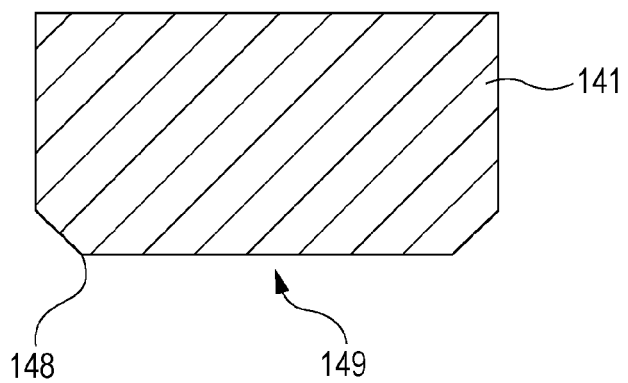
FIG. 6 is a sectional view illustrating the shape of a projecting portion according to a third exemplary embodiment.

FIG. 6 is a sectional view illustrating the shape of the projecting portion according to the third exemplary embodiment.

Also in the third exemplary embodiment, a projecting portion 149 having a ridge 148 that serves as a marking is formed on a side surface of each tooth 141. The projecting portion 149 is a protrusion that projects outward from the side surface of the tooth 141. However, unlike the second exemplary embodiment, one of two surfaces on both sides of the ridge 148 is at an angle relative to a rotation axis of the gear, and the two surfaces form an obtuse angle. When the ridge 148 has an obtuse angle, compared to the case in which the projecting portion is stepwise, the resin more easily flows and is more easily released from a mold in a resin molding process or the like.

In the third exemplary embodiment, each tooth has a single ridge 148 that serves as a marking. Even when the number of markings is one, the wear of the tooth is accurately measured at least in a region around the marking. Therefore, the wear may be accurately measured when the ridge 148 is formed near a location corresponding to the amount of wear to be measured (for example, a threshold for determining whether or not the gear is reusable).

Next, a fourth exemplary embodiment of the present invention will be described.

The fourth exemplary embodiment is similar to the third exemplary embodiment except that a recessed portion is formed in a side surface of each tooth instead of the above-described projecting portion 149. Therefore, only the difference from the third exemplary embodiment will be described, and redundant description will be omitted.

Figure 7:
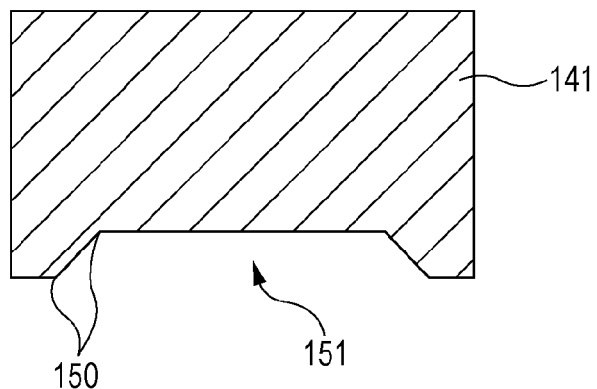
FIG. 7 is a sectional view illustrating the shape of a recessed portion according to a fourth exemplary embodiment.

FIG. 7 is a sectional view illustrating the shape of the recessed portion according to the fourth exemplary embodiment.

In the fourth exemplary embodiment, a recessed portion 151 having a ridge 150 that serves as a marking is formed in a side surface of each tooth 141. The recessed portion 151 is a cavity that is recessed inward from the side surface of the tooth 141. One of two surfaces on both sides of the ridge 150 is at an angle relative to a rotation axis of the gear, and the two surfaces form an obtuse angle. Also in the case where the recessed portion 151 is formed, similar to the third exemplary embodiment, when the ridge 150 has an obtuse angle, compared to the case in which the recessed portion is stepwise, the resin more easily flows and is more easily released from a mold in a resin molding process or the like.

Exemplary embodiments of the present invention have been described.

Although spur gears are described as an example in the above-described exemplary embodiments, the gears according to an exemplary embodiment of the present invention may instead be, for example, helical gears.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A drive transmission mechanism comprising:
   a plurality of gears having meshing teeth; and
   a recessed or projecting portion provided on a side surface of at least one of the gears, the side surface crossing a rotation axis of the at least one of the gears, the recessed or projecting portion being at least one of a cavity and a protrusion having a ridge that extends so as to follow an outline of at least one of the teeth and that serves as a marking for measuring wear of the at least one of the teeth,
   wherein the cavity penetrates through the at least one gear in an axial direction of the drive transmission mechanism and the protrusion protrudes from the at least one gear in the axial direction.

2. The drive transmission mechanism according to claim 1, wherein the recessed or projecting portion is at least one of a stepwise cavity and a stepwise protrusion.

3. The drive transmission mechanism according to claim 1, wherein at least one of two surfaces on both sides of the ridge is at an angle relative to the rotation axis of the at least one of the gears, and the two surfaces form an obtuse angle.

4. The drive transmission mechanism according to claim 1, wherein the cavity comprises a plurality of cavities provided on the side surface of the at least one of the gears.

5. The drive transmission mechanism according to claim 4, wherein each of the plurality of cavities penetrate through the at least one gear in the axial direction at a different depth from one another.

6. The drive transmission mechanism according to claim 1, wherein the protrusion comprises a plurality of protrusions provided on the side surface of the at least one of the gears.

7. The drive transmission mechanism according to claim 6, wherein each of the plurality of protrusions protrude from the side surface of the at least one gear in the axial direction at a different height from one another.

* * * * *